(12) United States Patent
Fontoura et al.

(10) Patent No.: US 7,392,239 B2
(45) Date of Patent: Jun. 24, 2008

(54) SYSTEM AND METHOD FOR QUERYING XML STREAMS

(75) Inventors: Marcus F. Fontoura, San Jose, CA (US); Vanja Josifovsld, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 1028 days.

(21) Appl. No.: 10/413,244

(22) Filed: Apr. 14, 2003

(65) Prior Publication Data

US 2004/0205082 A1 Oct. 14, 2004

(51) Int. Cl.
G06F 7/00 (2006.01)
G06F 17/30 (2006.01)
G06F 17/00 (2006.01)

(52) U.S. Cl. .............................. 707/3; 707/101; 707/102
(58) Field of Classification Search ...................... 707/2, 707/3, 4, 104.1
See application file for complete search history.

(56) References Cited

U.S. PATENT DOCUMENTS

| | | | | |
|---|---|---|---|---|
| 5,659,725 A | * | 8/1997 | Levy et al. | 707/3 |
| 5,742,806 A | * | 4/1998 | Reiner et al. | 707/3 |
| 5,758,335 A | * | 5/1998 | Gray | 707/2 |
| 5,963,932 A | * | 10/1999 | Jakobsson et al. | 707/2 |
| 6,073,129 A | * | 6/2000 | Levine et al. | 707/4 |
| 6,253,195 B1 | * | 6/2001 | Hudis et al. | 707/2 |
| 6,330,552 B1 | * | 12/2001 | Farrar et al. | 705/400 |
| 6,418,448 B1 | | 7/2002 | Sarkar | |
| 6,920,462 B2 | * | 7/2005 | Kircher | 707/104.1 |
| 2001/0037345 A1 | | 11/2001 | Kiernan et al. | |
| 2002/0073399 A1 | | 6/2002 | Golden | |
| 2002/0078068 A1 | | 6/2002 | Krishnaprasad et al. | |

FOREIGN PATENT DOCUMENTS

WO  WO 02/21339 A2  3/2002

OTHER PUBLICATIONS

Gudgin, "X Marks the Path", Developer Network Journal, No. 25, pp. 26-31, Jul.-Aug. 2001.
Edwards et al., "Persistent DOM: An Architecture for XML Repositories in Relational Databases", Intelligent Data Engineering and Automated—IDEAL 2000, Data Mining, Financial Engineering and Intelligent Agents, Second Int'l. Conference Proceedings, pp. 416-421, 2000.
Guido, "XML Data Processing and Relational Database Systems", XML Europe 1999 Conference Proceedings, pp. 713-717, 1999.

(Continued)

*Primary Examiner*—Apu Mofiz
*Assistant Examiner*—Brent Stace
(74) *Attorney, Agent, or Firm*—Norman L. Gundel; Hoffman, Warnick & D'Alessandro LLC

(57) ABSTRACT

A system and method for querying a stream of XML data in a single pass using standard XQuery expressions. The system comprises: an expression parser that receives a query and generates a parse tree; a SAX events API that receives the stream of XML data and generates a stream of SAX events; an evaluator that receives the parse tree and stream of SAX events and buffers fragments from the stream of SAX events that meet an evaluation criteria; and a tuple constructor that joins fragments to form a set of tuple results that satisfies the query for the stream of XML data.

10 Claims, 5 Drawing Sheets

OTHER PUBLICATIONS

Shanmugasundaram et al., "A General Technique for Querying XML Documents Using a Relational Database System", SIGMOD Record, vol. 30, No. 3, pp. 20-26, Sep. 2001.

Shanmugasundaram et al., "Relational Databases for Querying XML Documents: Limitations and Opportunities", Proceedings of the 25th Int'l. Conference on Very Large Data Bases, pp. 302-314, 1999.

* cited by examiner

Input XML

```
<t> 1
   <g>2</g>
   <a>3
      <b>4</b>
      <c>5</c>
   </a>
   <a>6
      <a>7
         <b>8</b>
         <c>9</c>
      </a>
      <c>10</c>
   </a>
</t>
<t>11
   <g>12</g>
</t>
...
``` g output buffers

| Fragment | Ancestor sets |
|---|---|
| <g>2</g> | ASt={1} |
| <g>12</g> | ASt={11} | b/text() output buffers

| Fragment | Ancestor sets |
|---|---|
| 4 | ASt={1}; ASa={3} |
| 8 | ASt={1}; ASa={6,7} | c/text() output buffers

| Fragment | Ancestor sets |
|---|---|
| 5 | ASt={1}; ASa={3} |
| 9 | ASt={1}; ASa={7} |
| 9 | ASt={1}; ASa={6} |

Result

| g | b/text() | c/text() |
|---|---|---|
| <g>2</g> | 4 | 5 |
| <g>2</g> | 8 | 9 |
| <g>2</g> | 8 | 10 |

FIG. 8

SYSTEM AND METHOD FOR QUERYING XML STREAMS

BACKGROUND OF THE INVENTION

1. Technical Field

The present invention relates generally to processing mark-up language data, and more specifically relates to a single pass system and method for querying streams of XML data.

2. Related Art

As XML (extensible mark-up language) continues to gain popularity as a format for storing, sharing, and manipulating data, new tools and systems are being introduced to increase its flexibility. One important feature necessary to provide robust XML data processing applications involves the ability to query XML data. More specifically, with the growing popularity of streamed applications over networks such as the Internet, facilities for efficiently querying streams of XML data will become more and more critical.

Relational databases currently have efficient relational operators that can be re-applied for querying XML streams. Nevertheless, they lack support for XPath expressions, which are used to navigate through XML documents in most of the XML query mechanisms, such as XQuery and SQL/XML. While there are several implementations of XPath/XSLT that can be adapted for path processing in a relational engine, they are inadequate for the task of efficiently querying streamed XML data.

One obstacle in using the current XPath/XSLT technology in conjunction with a database engine is the mismatch between the tuple oriented model of the database engines and the node set model of the XPath processors. Retrieving multiple values from an XML document corresponds to retrieving multiple columns from a relational table and is very often needed. Achieving this goal for XML streams using the available XPath processors requires either materialization of the whole input stream, or significant changes to the query execution pipeline and optimizer to split one incoming stream into several streams of single valued results.

Another issue with the state-of-the-art XPath processors is that they are designed to operate over an in-memory Document Object Model (DOM) or similar representation of the input XML document. This approach does not work well when the documents are streamed, that is, when only certain fragments of the documents are available at query time. In this respect, current implementations assume that the XML documents are entirely available at query time. This processing model requires memory in the range of the input document size. In contrast, database engines are engineered to serve large numbers of concurrent users using limited main memory. A memory intensive XPath processor within a database engine can severely limit the number of users the system can support. Accordingly, a need exists for an efficient system and method of querying streams of XML data.

SUMMARY OF THE INVENTION

The present invention addresses the above-mentioned problems, as well as others by providing a system and method for querying a stream of XML data in a single pass using standard XQuery/XPath expressions. In a first aspect, the invention provides a system for querying a stream of mark-up language data, comprising: an expression parser that receives a query and generates a parse tree; a system that receives the stream of mark-up language data and generates a stream of events; an evaluator that receives the parse tree and stream of events, and buffers fragments from the stream of events that meet an evaluation criteria; and a tuple constructor that joins fragments to form a set of tuple results that satisfies the query for the stream of mark-up language data.

In a second aspect, the invention provides a program product stored on a recordable medium for querying a stream of mark-up language data, wherein the program product comprises: parsing means for receiving a query and generating a parse tree; means for receiving the stream of mark-up language data and generating a stream of events; evaluating means for receiving the parse tree and stream of events, and for buffering fragments from the stream of events that meet an evaluation criteria; and construction means for joining fragments to form a set of tuple results that satisfies the query for the stream of mark-up language data.

In a third aspect, the invention provides a method of querying a stream of mark-up language data, comprising: receiving a query and generating a parse tree; receiving the stream of mark-up language data and generating a stream of events; evaluating the parse tree and stream of events, and buffering fragments from the stream of events that meet an evaluation criteria; and joining fragments to form a set of tuple results that satisfies the query for the stream of mark-up language data.

BRIEF DESCRIPTION OF THE DRAWINGS

These and other features of this invention will be more readily understood from the following detailed description of the various aspects of the invention taken in conjunction with the accompanying drawings in which:

FIG. 8 depicts an exemplary set of tuple construction output buffers in accordance with an embodiment of the present invention.

DETAILED DESCRIPTION OF THE INVENTION

1. System Overview

Figure 1:
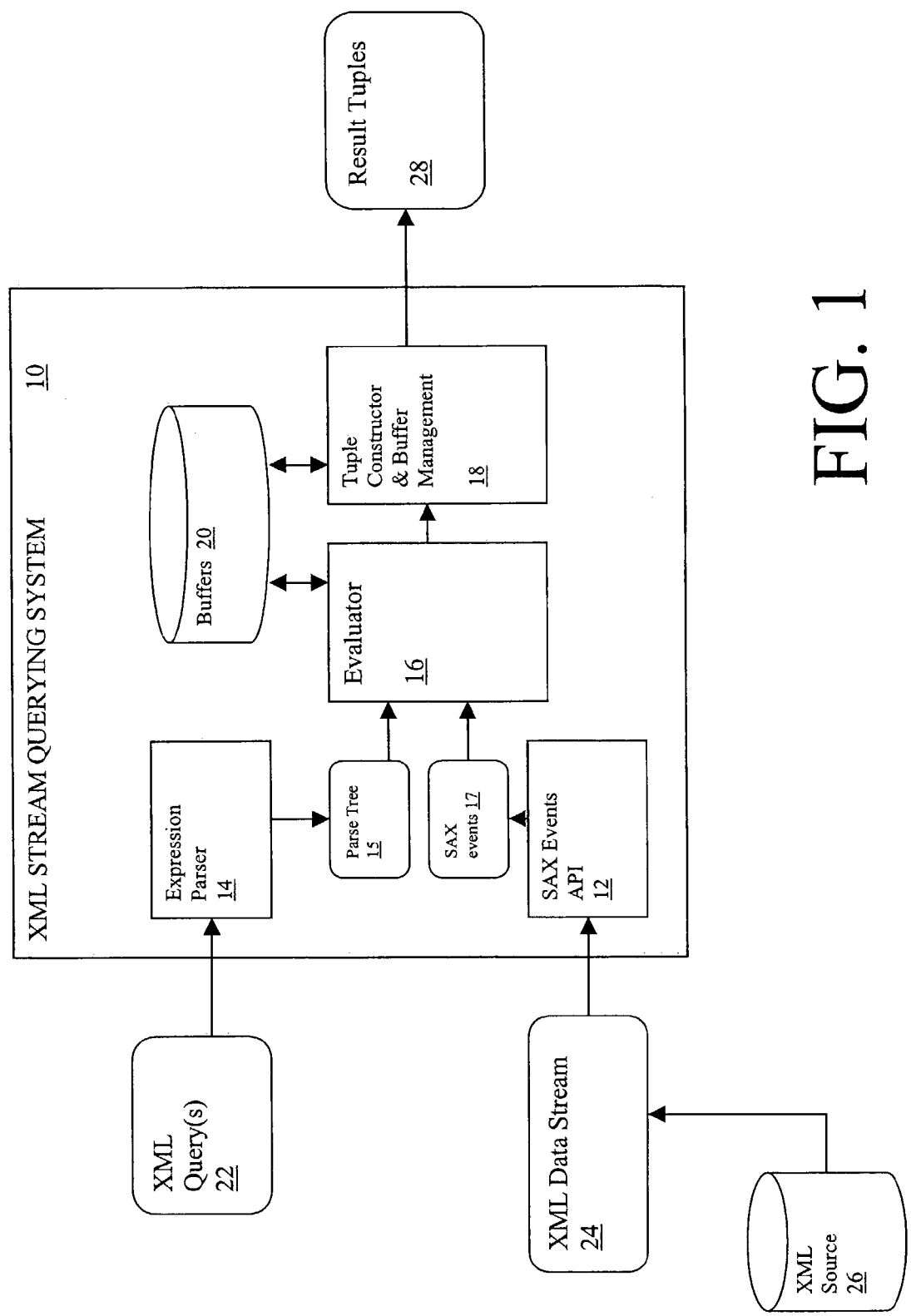
FIG. 1 depicts an XML stream querying system in accordance with an embodiment of the present invention.

The present invention relates generally to processing mark-up language data. Accordingly, it should be understood that while the invention is described herein implemented in an XML (extensible mark-up language) environment, the invention could be implemented using any mark-up language. Referring now to the drawings, FIG. 1 depicts an XML stream querying system 10 that receives one or more XML queries 22 for querying XML data stream 24. XML stream querying system 10 processes the XML data stream 24 in a single pass and generates result tuples 28 comprising a set of correlated XML fragments. XML stream querying system 10 may be implemented as a software program that can be run or executed on any type of computer system (not shown).

Each XML query 22 may be comprised of standard XQuery/XPath expressions so that compatibility is maintained with existing standards. Details describing the types of expressions supported by XML stream querying system 10 are discussed in further detail below. Because XML stream querying system 10 is able to process XML data and evaluate one or more XML queries 22 in a single pass, the need to store large amounts of XML data is obviated (e.g., an entire document need not be stored). The result is that the XML data stream 24 may be processed as a dynamic stream originating from any source 26. For instance, XML data stream 24 may be processed as a continuous stream received over a network such as the Internet, from a wireless device, from a local or remote database, etc. XML data stream 24 may likewise originate from a more static source, such as a stored document.

XML stream querying system 10 imports the XML data stream into a SAX events API 12, which are known in the art, to generate a set of SAX events 17. XML queries 22 are imported into an expression parser 14, which generates a parse tree 15 ("PT") for each query. The parse tree 15 and SAX events 17 are fed into evaluator 16, which uses the SAX events 17 to perform state transitions and populate the buffers 20. Evaluator 16 is also responsible for triggering the tuple construction/buffer management module 18 when the buffers 20 contain enough information to output result tuples 28. Details of these operations are provided in further detail below.

2. Exemplary Architecture and Implementation Overview

It is understood that the above-described XML stream querying system 10 ("query system 10") can be utilized in any XML environment. Accordingly, for the purposes of this disclosure, it is understood that the terms XML data stream 24 and "document" may be used interchangeably. In one embodiment, query system 10 could be utilized in a DB2® XML relational database engine in which XML queries are translated by the engine into execution plans where the path processing operators have the same role as table accesses in traditional query evaluation pipelines. The fragments extracted by the path processing operators can then be transformed and combined by traditional relational operators such as joins, grouping, correlation, sorting, etc., and by XML specific operators, like the XML generation operators used to process the 'RETURN' clause of XQuery.

Figure 2:
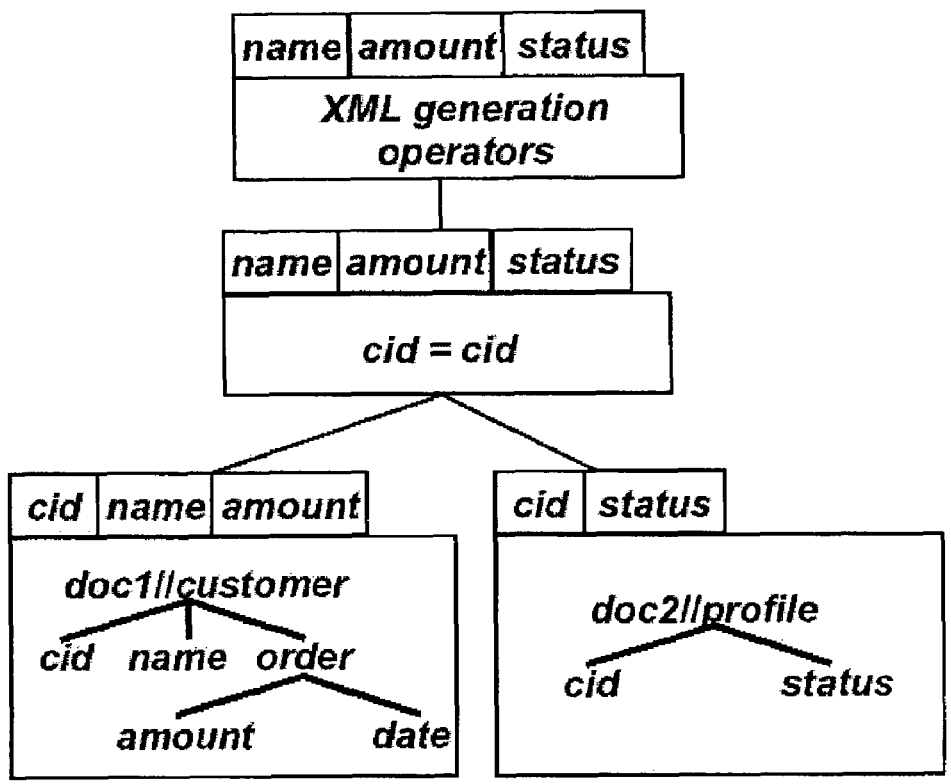
FIG. 2 depicts an exemplary query evaluation plan in accordance with an embodiment of the present invention.

FIG. 2 illustrates how DB2 can process multi-stream XQuery queries, using the following query as an example:

```
FOR $c IN document("doc1.xml")//customer
    FOR $p IN document("doc2.xml")//profiles[cid/text( ) = $c/cid/text( )]
        FOR $o IN $c/order
            WHERE $o/date = '12/12/01'
            RETURN
                <result>
```

The query is decomposed into two single document accesses that produce tuples of XML fragments from 'doc1' and 'doc2'. These tuples are then combined by a relational join on 'cid' using value equality since the predicate is evaluated over simple values generated by the text( ) function. Finally, XML generation operators are used to format the result as specified with the RETURN clause.

The query system 10 components take an XML document (stream) identifier, and an XQuery fragment passed by the compiler. It generates an intermediate result with n XML data type columns as output. In FIG. 2, the operator on the bottom left represents one invocation of query system 10 with the fragment:

```
FOR $c IN document("doc1.xml")//customer[order/date="12/12/01"]
    LET $cid := $c/cid/text( )
    LET $name := $c/name
    FOR $o in $c/order
        LET $a in $o/amount
        RETURN $cid, $name, $a;
```

The RETURN clause in the example is used to identify the variables to be bound-out, it does not conform to the standard XQuery definition. The operator returns tuples with 3 bindings (document fragments), one for each bound-out variable. Query system 10 can process both FOR and LET clauses. LET clauses are processed in a similar manner as the FOR clauses, except that multiple results are grouped together in the operator and returned as a single sequence of XML fragments. Such pushing of grouping into the query system 10 operator is simple to perform while it reduces the number of tuples flowing through the engine. Since the processing of LET and FOR clauses is very similar, the following description describes only the processing of the FOR clause queries to simplify the discussion.

As noted above, the main components of query system 10 are the expression parser 14, the evaluator 16, and the tuple constructor/buffer manager 18, as illustrated in FIG. 1. The input path expressions are parsed and connected into a single parse tree (PT) 15 with one or more output nodes. Intermediate results representing XML fragments retrieved from the input document are stored in buffers 20 associated with the output nodes. During document processing, a SAX events API 12 generates events 17 from the input XML data stream 24. The evaluator 16 uses these events to perform the state transitions and populate a set of output buffers 20. The evaluator 16 is also responsible for triggering the tuple construction module when the output buffers 20 contain enough information to output result tuples 28. The following sections detail each of these components.

3. Expression Parser

Figure 3:
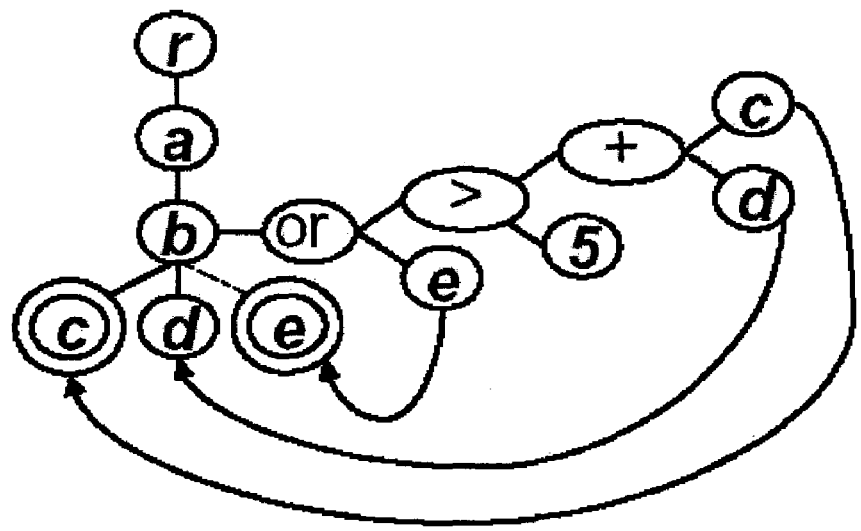
FIG. 3 depicts an exemplary parse tree in accordance with an embodiment of the present invention.

The expression parser 14 is responsible for parsing the set of XPath expressions and producing a single parse tree 15 (PT). Nodes in the PT 15 correspond to node tests in the input path expressions while edges correspond to the relationship between node tests in the query. In the case when a node test in the query is followed by a predicate containing multiple branches or when several expressions are rooted in the same variable, the corresponding PT node has multiple children. FIG. 3 illustrates the tree generated by parsing the query:

```
FOR $b in document(". . .")/a/b
    FOR $c in $b/c
        FOR $d in $b/d
            FOR $e in $b//e
                WHERE $c + $d > 5 or $e
                RETURN $c, $e
```

In this example the node representing 'b' has three children, one for each query branch. Each PT 15 has a special root node at the top, represented by 'r' in FIG. 3. All PT nodes except the root have a flag indicating the axis of the represented node test. There are several axis defined in XQuery, allowing each document node to be reached at any point of the processing. In one exemplary embodiment, query system 10 supports the four most commonly used axes: child ('/'), descendant-or-self ('//'), self ('.'), and attribute ('@'). Node tests over attribute axis are represented in the PT 15 by separate nodes and are handled in a similar fashion as element node tests. In a further embodiment, query rewrites may be implemented to allow support for more of the XQuery/XPath axes, including parent and ancestor axes. In FIG. 3, the dotted line between the 'b' and the 'e' node represents the descendant-or-child axis. The solid lines between the other nodes represent the child axis.

Any PT node, including the internal nodes, can be an output node. Output nodes can also be descendants of other output nodes. In FIG. 3, the output nodes 'c' and 'e' are distinguished from the other nodes by double circles. Output nodes correspond to the bound-out variables from the input query.

A PT node may also have a set of associated predicate parse trees. Each predicate tree is anchored at a PT node, called the context node for that predicated. In the FIG. 3 example, 'b' is the context node for the predicate $c+d>5\;$ or $\;$ e$. Predicate trees are composed of leafs that are either constants or pointers to nodes in the PT subtree rooted at the context node. Internal nodes are operators as defined in the XQuery/XPath standard specifications.

4. Evaluator

The evaluator 16 is the central component of the query system 10. It uses the PT 15 to process the stream of SAX events 17 generated from the input stream to identify the fragments that are to be extracted and returned to the database engine. The PT 15 is static, meaning that it does not change during processing, and can be reused over several documents. Besides the PT 15, the evaluator 16 uses three dynamic structures that change during query evaluation depending on the input document:

(1) work array (WA): used to match the document nodes with query steps and to support existential predicate evaluation during the processing of the SAX events;
(2) output buffers: store the intermediate results that can be part of the result tuple;
(3) predicate buffers: store the content of nodes participating in predicate expressions.

The WA represents an inlined tree structure and can be compared in function to the DOM tree of the traditional XPath processors. An important difference is that the WA represents only the "interesting" portions of the tree, based on the already seen input. Furthermore the WA is specifically designed for efficient processing of the query as opposed to the dual (traversal and query processing) purpose of the DOM representations in XPath/XSLT processors. During document processing, the WA changes depending on the input. Each WA entry has four fields:

(1) Pointer to the corresponding PT node;
(2) Document level at which the entry was added to the array;
(3) References between parent-child WA entries;
(4) Status flag, used during the processing to indicate if the corresponding document node has satisfied the query conditions.

The SAX events 17 produced by parsing the input document are transformed into evaluator events of form (name; type; document level) where name is the node test name and type is the event type, which can be either OPEN, CLOSE, ATTRIBUTE, COMMENT, or PI. The document level is maintained by the SAX event handler by simply counting the OPEN and CLOSE events. By convention, the document root appears at level 0. The processing of a document starts with a (ROOT, OPEN, 0) event and ends with a corresponding CLOSE event.

The evaluator works by trying to match incoming events to all the WA entries. A match occurs when both the document levels and the names of the event and the WA entry are the same. A match also occurs when only the names match if the entry corresponds to a descendant-or-self path step (in this case the document level is ignored). On the other hand, when an entry corresponds to an any node test PT node (represented by '*' in XQuery), the name comparison always returns TRUE and only the document level is considered. WA entries corresponding to attributes, comments, and processing instructions (PI) node tests match only events of type ATTRIBUTE, COMMENT, and PI, respectively. The ATTRIBUTE events for the evaluator 16 are produced by iterating over the attributes in the StartElement SAX handler. ATTRIBUTE, COMMENT, and PI events are handled in a similar manner as two consecutive OPEN and CLOSE events and are therefore not discussed further. The following actions are performed by the evaluator when a match is found for OPEN and CLOSE events:

OPEN: For each child of the PT node corresponding to the matched WA entry, a new child WA entry is added, carrying the current document level incremented by one. The children added for the same WA match compose a sibling group. When the matched WA entry corresponds to a leaf node in the PT, no new entries are added to the WA. In this case, if the PT node is not an output node, the status flag of the matched WA entry is set to TRUE, indicating that all the conditions for this node have been satisfied.

For each matched entry corresponding to an output node in the PT (either leaf or not), a buffer is created to save its content. This buffer is then added to a list of active buffers. During processing, every SAX event is forwarded to all active buffers. In an exemplary embodiment UTF16 textual representation may be used for the buffered document fragments. When parsing a portion of the input stream that is to be buffered, the content of each event is translated from its original encoding into UTF16 and it is added to all active buffers.

CLOSE: For every output node (either leaf or not), the CLOSE event removes the buffers associated with the matched node from the list of active buffers. For leaf output nodes the CLOSE event also sets their status in the WA to TRUE. This change of the status indicates that the matching was satisfied and that the results are available in the corresponding output buffers. CLOSE events have no effect in leaf entries that are not output nodes, since their status can be updated on OPEN events.

In the case that the matched node is an intermediate PT node (non-leaf), the WA must contain a sibling group that was added when the same node was matched with a corresponding OPEN event. During the CLOSE event, the status of the node must be evaluated by checking the status of its sibling group entries. For simplicity, consider the case that there are no predicates involved (predicates are discussed in detail below). In this case the status flags of the node is computed by ANDing the status flags of its sibling group. At this point, the sibling group entries are removed from the WA. The matched WA entry, however, remains to be used when its parent node is closed. Furthermore, if the status of the matched WA entry was previously set to TRUE, it remains so even if the evaluation of its status returned FALSE. This allows for the existential semantics of XQuery where a path is satisfied over a set of children nodes if any of the nodes satisfy all the conditions (and not necessarily the last one).

Note that if the status of the node evaluates to FALSE, the buffers added between the matching OPEN and CLOSE events need to be purged from the queues. The mechanism to identify these buffers is described in further detail below.

Figure 4:
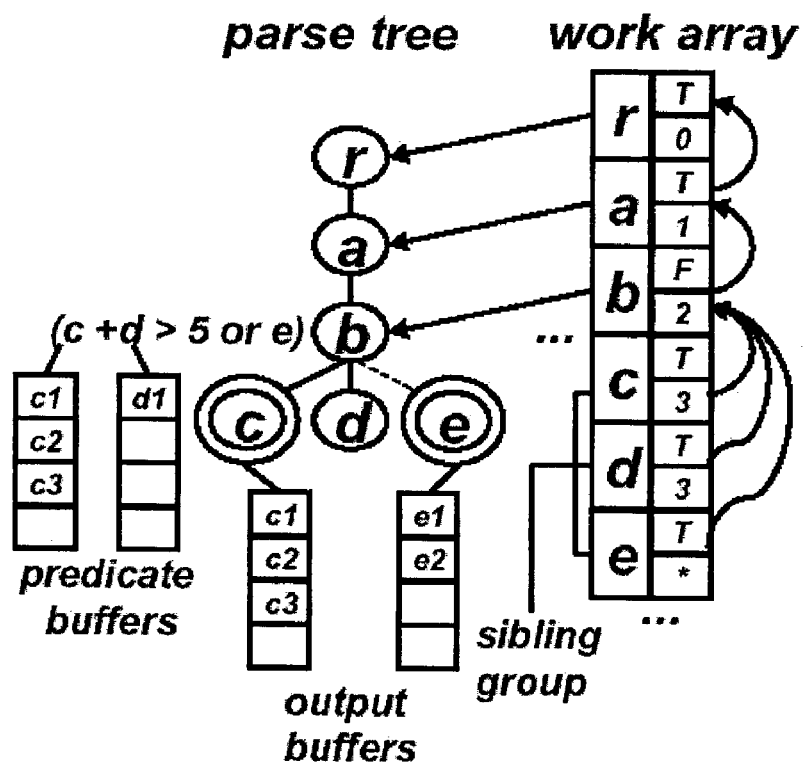
FIG. 4 depicts an exemplary parse tree, input document and work array in accordance with an embodiment of the present invention.

State transitions in the evaluator are represented by changes of the content of the WA. To illustrate the processing, an exemplary query and the sample document are shown in FIG. 4. The state of the evaluator 16 after each event is represented in the figure by a snapshot of the WA. The event leading to a snapshot is given on the top. In each entry, a node test name is used to represent pointers to the corresponding PT nodes. The entry document level is shown in the lower right corner and the evaluation status (TRUE/FALSE) is in the upper right corner. Entries matching node tests that are performed over the descendant-or-self axis have '*' instead of a document level number. A link on the left side of the WA entries is used to relate multiple entries from a single sibling group. The references between parent/child WA entries are omitted for clarity.

The array grows with events matching non-leaf PT nodes. For example, one sibling group consisting of entries 'c' and 'b' is added for each occurrence of the two consecutive 'a' elements in the document. These sibling groups are removed when the corresponding 'a' nodes are closed. Note that an entry for 'a' is added to the array before the first 'a' in the document is seen and persists after the last 'a' is closed. This is due to the fact that the WA represents not only the important nodes that have already been seen in the document, but also the nodes that we are looking for. The status of the 'a' entry is set when the first 'a' is closed. Once set to TRUE the status is unchanged until the entry is removed from the array. In the present example, this is apparent when the second 'a' node does not satisfy the condition (there is no b child), and the status of the 'a' entry remains TRUE. This principle allows the same data structure (WA) to be used for keeping track of which conditions have been satisfied so far, as well as, for detecting relevant document nodes. The status of the root 'r' entry mirrors the status of its only child. Query system 10 uses this optimization to be able to use the root node status as an indicator in containment queries.

The status of the 'c' entry is set to TRUE when the 'c' element is open. The 'c' node is not an output node and therefore its condition is satisfied when (OPEN) the first 'c' under the current 'a' node is encountered. As 'b' is an output node, the status of 'b' WA entries is changed when a 'b' element is closed, since only then the output buffers are complete and can be used to generate the tuples.

Figure 5:
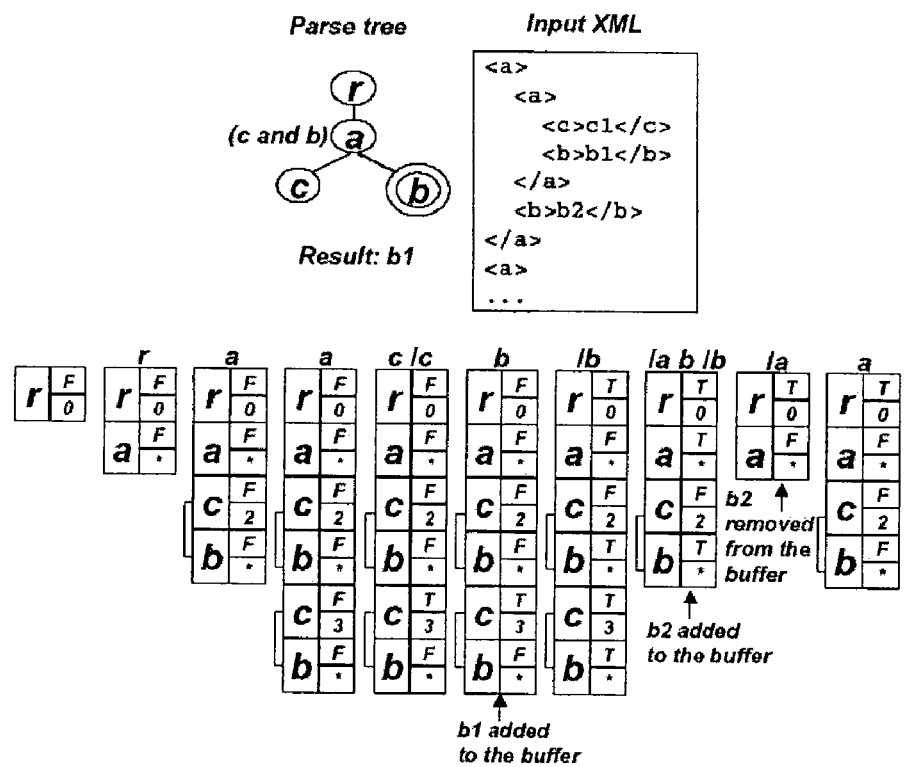
FIG. 5 depicts an exemplary parse tree, recursive input document and work array in accordance with an embodiment of the present invention.

One difficulty in designing a streamed XML path processor is to provide correct behavior with recursive documents where an element can encompass another element with the same name. The document depicted in FIG. 5 is an example of such document with recursive nesting of 'a' nodes. Due to the nature of the streaming data, retrieving fragments and constructing tuples in recursive cases poses several technical challenges and requires more elaborate solutions, since the processor needs to evaluate conditions for several elements simultaneously. While not common, correct handling of recursive cases is important to ensure correct evaluation over any input document.

In non-recursive cases, the WA has at most one entry for each PT node, limiting the size of the array to the size of the query. The WA is therefore pre-allocated to this size to limit the memory management calls to the operating system. Processing of recursive documents can increase the WA size over this limit by adding multiple WA entries corresponding to the same PT node in order to process the conditions for multiple document nodes simultaneously. This is necessary since WA entries for recursive elements will be parents of multiple sibling groups, each representing an independent thread of control evaluating one of the recursive occurrences of the element. In the general case, the maximum size of the WA is therefore proportional to the product of the degree of recursion and the maximum fan-out (number of children) in the PT. Recursive documents are not common, so WA entries for the recursive elements are allocated dynamically from the memory heap. FIG. 5 shows a modification of the example above with a recursive document where instead of two consecutive 'a' elements; the second 'a' element is nested within the first.

In the modified example, after the second 'a' element is opened there are two 'a' sibling groups composed of 'b' and 'c' entries, one for each 'a' element. The 'c' event matches only the WA entry with the appropriate document level. This reflects the fact the 'c' entry is a child of only one of the enclosing 'a' elements. The 'b' events, on the other hand, match both 'b' entries since the 'b' node test is specified using the child-or-descendent axis. At closing of the inner 'a' element, the flags in the WA entries of its sibling group are AND-ed. The status of the 'a' entry is changed to TRUE since both entries have status TRUE. This is not the case when the outer 'a' element closes, since there is no 'c' child in this case. While this does not have an effect on the 'a' status flag, which remains TRUE, it results in a dropped buffer for the second 'b' element since it does not participate in any output tuple (buffer management is further discussed below). Note that although the second 'b' element is evaluated to TRUE it does not change the status of the flags already set to TRUE by the first 'b' element, reflecting that a descendant 'b' had already been found.

5. Predicate Evaluation

The predicates are evaluated when the document node matching the anchor PT node is closed. Terms of boolean predicates that are simple paths are evaluated by using the values of the status flags in the WA entries of the sibling group corresponding to the matched entry. In the example above, when an 'a' node is closed, the status flags of the 'b' and 'c' entries are AND-ed by the predicate anchored at the 'a' PT node. However, in the general case, predicate evaluation may require non-boolean values stored in predicate buffers.

Figure 6:
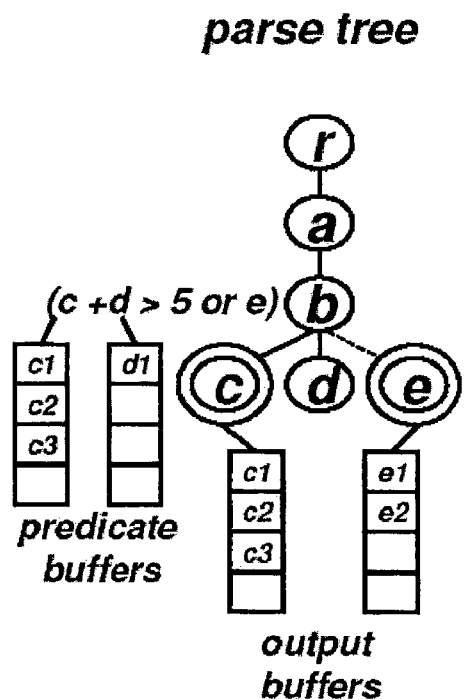
FIG. 6 depicts an exemplary evaluator data structure for a predicate evaluation in accordance with an embodiment of the present invention.

To illustrate this, let us consider the example in FIG. 6 with the expression c+d>5 or e. In order to evaluate this expression, the textual content of node 'c' and 'd' are stored in predicate buffers during the processing. Node 'e' is not buffered in predicate buffers since its existence can be detected by checking the status flag of the 'e' WA entry. However, note that since 'e' is an output node, it is buffered in the output buffers. Note that a given node can be buffered both in an output buffer and a predicate buffer at the same time, although this is not a common situation.

Similar to output buffers, during expression parsing, all the nodes that need to be buffered in predicate buffers are marked with a flag in the PT 15 and the query system 10 allocates the predicate buffers for storing their content. In addition, both predicate buffers and output buffers are updated in the same way, which is in document order. This is a requirement for predicate buffers since the XPath casting rules are order dependent.

As previously described, a predicate tree has operators as internal nodes and constants or pointers to PT nodes as leafs. During processing, an evaluate( ) method is invoked in the root of the predicate tree. This call triggers the invocation of evaluate( ) in all the remaining nodes in the tree. In the example, when closing context node 'b' the system would invoke evaluate( ) on the root of its predicate tree, which is the 'or' node. Node 'or' would in turn call evaluate( ) on '>', and, if that returned FALSE, it would call evaluate( ) on 'e' and so on.

Evaluation of leaf nodes requires access to the predicate buffers and possible type conversions. In the present example, the evaluation of '+' would get the first 'c' and 'd' elements from the predicate buffers, convert their value to numbers, and perform the addition. The resulting number would be returned to the '>' node, which would compare it to the constant number 5.

Figure 7:
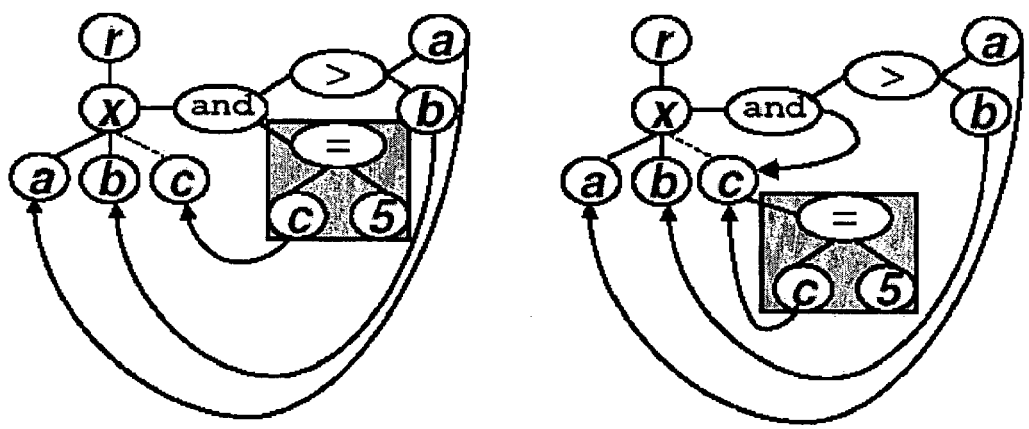
FIG. 7 depicts an exemplary predicate pushdown in accordance with an embodiment of the present invention.

In general, a predicate can be completely evaluated only when its anchor node is closed. The predicate in the expression x[a>b], for example, can only be evaluated when 'x' is closed, since the XQuery existential semantics requires that all combinations of 'a' and 'b' children are tested for a match. However, predicates that refer to only one PT node can be eagerly evaluated, increasing the system performance and reducing the buffering requirements. In these cases, query system 10 applies a rewrite named predicate pushdown as illustrated in FIG. 7. Predicates that refer to only one PT node are moved to the refereed node. In the example, the predicate c>5 is moved down in the PT 15 to node 'c'. By doing this, predicate c>5 is evaluated every time a 'c' node is closed, instead of only being evaluated when the 'x' node is closed.

Therefore, only one 'c' node is buffered, as opposed to buffering all 'c's and applying the predicate to each of them when the corresponding ancestor 'x' is closed. If the predicate was not satisfied by any of the 'c' nodes, the status flag of the corresponding 'c' entry in the WA remains FALSE, otherwise it is set to TRUE. The remaining parts of the predicate are still evaluated in the same manner when 'x' nodes are closed.

6. Tuple Construction

Query system 10 does not rely on predefined schema and knowledge of the input document structure. The fragments retrieved from the document can come in any order. As the tuple processing model requires that the retrieved fragments be matched (joined) into tuples if several bindings for one or more of the tuple variables appear before the tuples are completed, these must be buffered. For example, when returning tuples <a, b>, query system 10 must buffer all 'a's that appear in the document before the first 'b' appears (or vice-versa).

Buffers in multiple output queues are combined into tuples depending on their position in the input document. The goal of the tuple construction phase is to construct only correct tuples, out of all possible tuples in the cross-product of the buffer queues. Since the document is unavailable at construction time (streamed through), each buffer must be annotated with enough information to complete the tuple construction.

In order to preserve the position of the buffer content in the input document tree, a unique node ID (NID) is assigned to each element in the input document. Each buffer is annotated with its ancestor NIDs, called ancestor sets (AS). Expecting a small number of buffers in the queues, our current implementation performs a nested loop join using the non-empty intersection of the ancestor sets as a condition for the validation of the tuples. To illustrate this approach let us consider the query:

```
FOR $t in document(" ... ")/t
    FOR $g in $t/g
        FOR $a in $t/a
            FOR $b in $a//b/text( )
                FOR $c in $a/c/text( )
                    RETURN $b, $c, $g
``` over the document fragment in FIG. 8. For clarity, it is assumed that the NIDs assigned to the elements in the example are the numbers given after each start element tag. Since there are three variables in the output tuple, the system keeps three buffer queues. After processing the example document, the queues contain altogether seven buffers. The result, however, contains only three tuples as opposed to 12 produced by the cross product of all the buffer queues. Some of the tuples are pruned from the result since they do not satisfy the structural constraints of the document. In the example, 'b' and 'c' buffers can appear in the same tuple only if both of them were found under the same 'a' node. This reasoning can be applied recursively up the parse tree: 'g' buffers join with <b, c> tuples that appear under a common 't' node.

The tuple construction algorithm builds new tuples by starting from a tuple without any bindings and adding variable bindings (buffers) to it. The algorithm iterates over the buffers, and for each buffer it checks if the addition of that buffer to the tuple would generate a valid (but possibly still uncompleted) tuple. This verification step checks if the intersection of each of the ancestor sets associated with that buffer and the corresponding ancestor sets of the tuple is not empty. Each tuple ancestor set is an intersection of the corresponding ancestor sets for all the bindings in the tuple so far. When all variables are bound in the tuple, the tuple is complete and it is emitted.

In this example, the algorithm would start with adding the first buffer (NID=2) of the first buffer queue ('g') to the initially empty tuple. This would change the tuple ancestor set for the node 't', TupleASt, which would be initialized from the buffer ancestor set TupleASt=ASt=f1g. Next, the algorithm would try to bind values to the remaining two tuple columns by selecting the first buffer (NID=4) from the second buffer queue (b/text( )). In this case, since the intersection of TupleASt and ASt for NID=4 is non-empty, the binding is added to the tuple. In addition, since NID=4 has an ancestor set for node 'a', ancestor set for 'a' in the tuple would be created and initialized to TupleASa=f3g. The algorithm would then proceed for the first 'c/text( )' fragment (NID=5). The correctness of the tuple would be verified by checking the intersection of TupleASt and ASt for NID=5 and the intersection of TupleASa and ASa for NID=5, which are both non-empty. Therefore, the first tuple would be constructed with buffers representing the elements with NIDs 2, 4, and 5. Following the nested-loop pattern, the 'c/text( )' fragment with NID=5 will be replaced in the tuple by the next one the same queue, which has NID=9. In this case, the intersection of ASa and TupleASa would be empty, and the tuple for NIDs 2, 4, and 9 would not be emitted. The algorithm then proceeds for the remaining combinations of output buffers, generating the tuples in the Result table of FIG. 8.

The tuple construction algorithm emits each tuple once, without regard to the cardinality of the intersections of the ancestor sets of the participating buffers. This eliminates the need for duplicate removal operators on the top of the query system 10 operator.

7. Buffer Management

Once a fragment is retrieved into a buffer it can either be outputted as part of the result or discarded if some of the query condition failed. This section discusses the circumstances when a buffer can be deleted in order to release the space and lower the memory requirements of the processor.

a. Buffer Elimination Due to Failed Condition

The tuple construction algorithm described above requires that all the buffers in the output buffer queues satisfy the query conditions. Therefore, buffers that do not satisfy these conditions must be eliminated before the tuple construction starts.

As described before, the status of each node is evaluated in its close event. Therefore, when an element is closed and not all the query conditions are satisfied, its NID is removed from all the ancestor sets of all buffers in system. If, for some buffer, this removal results in an empty set for at least one of the ancestor sets, the buffer does not satisfy the query conditions and it is discarded.

An example of such a case is shown in FIG. 5. At the point when the outer 'a' element is closed, the output queue of the 'b' node contains two buffers, one for the fragment '<b>b1</b>' and another one for fragment '<b>b2</b>'. The first of this buffers has ASa=f1, 2g, for both 'a' nodes, while the later has ASa=f2g. Since the conditions under the outer 'a' (NID=2) are not satisfied (no 'c' child) the NID of the outer 'a' is deleted from the ancestor sets of the both 'b' the buffers. This leaves the buffer for '<b>b2</b>' with no valid 'a' parent and the buffer is dropped from the queue. The buffer containing '<b>b1</b>' is not removed since its ancestor set for 'a' still contains the inner 'a' (NID=1).

b. Buffer Elimination Due to Expiration

As presented above, the tuple construction process assumes that all the fragments that participate in result tuples 28 are extracted from the document and stored in buffer queues before the first tuple is emitted. For most documents this is not necessary. Often, fragments that participate in the result do not need to be kept in buffers until the end of the document. A buffer can be discarded after all the possible tuples that use this buffer have been constructed. To establish this point of expiration the concept of Lowest Common Ancestor Node (LCAN) is defined as a parse tree node such that:

1. It is a parent of all the output nodes;
2. It is not a parent of any other node that satisfies 1.

Since each query has at least one output node, each query must have a LCAN. In fact there is exactly one LCAN for every query since if there existed two LCAN nodes they could not be related as child and parent due to condition 2 defined above.

During processing, the evaluator 16 keeps track of the document level at which the outermost match to the LCAN is made (due to recursion there might exist several properly nested document subtrees with roots matching the LCAN node). At closing element action, if the closed level matches the outermost LCAN document level and all the conditions in the closing node are verified, the tuples can be emitted. In this case, after emitting the tuples, all the buffers are deleted and all the counters used to generate IDs for the document nodes are reset.

In the example described in FIG. 8, the LCAN node is 't'. By the time the outermost 't' closes (NID=1) all the conditions are verified, the tuple construction process is trigged, the correct tuples are emitted, all the buffers are deleted, and all the counter are reset. As another example, consider the query:

```
FOR $s IN document(" ... ")//store
    LET $sn := $s/name
    LET $cn := $s/customers/customer/name
        RETURN $sn, $cn
``` retrieving the store and the customer names applied to the document:

```
<store>
    <name>Sears</name>
    <customers>
        <customer><name>John Doe1</name></customer>
        <customer><name>John Doe2</name></customer>
```

-continued

```
        ...
    </customers>
</store>
```

The LCAN node is 'store' since it is an ancestor of the both output nodes. The names of the customers are kept until the end of the 'store' element because another store name might appear at any point within this element, producing one more tuple for each customer. While possible, such document organization is very unlikely. To avoid unnecessary large buffer queues, the processor needs to know either that there is only one store name or that they are all given before the customer entries. This is an example where schema information about the input document can lower the memory consumption. If in the query the store name was not an output node, the LCAN would be lowered to 'customer' and buffering time would be reduced.

Clearly the document organization can impact the performance of some queries. In the case when the user can influence the organization of the input document, the elements should be grouped by their tag names to allow for use of schema information as above. While the mechanism to detect or extract this information from XMLSchema or DTD and to pass it to Query system 10 might require severe modification of the database engine, its use in the evaluator 16 is very simple. Another document organization rule that might decrease the memory consumption is that the bulkier extract elements should appear as late in the document as possible since the elements found earlier in the document are buffered for longer time than those found later.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

APPENDIX A

This appendix presents a BNF of a supported XQuery subset. The terminals are defined by known XQuery standards.

| | |
|---|---|
| TXPExpr | ::= ForClause WhereClause? |
| | \| LetClause WhereClause? |
| ForClause | ::= 'for' Variable 'in' LocationPath (',' Variable 'in' LocationPath)* |
| LetClause | ::= 'let' Variable ':=' LocationPath (',' Variable ':=' LocationPath)* |
| WhereClause | ::= 'Where' PredicateExpr |
| LocationPath | ::= RelativeLocationPath |
| | \| '/' RelativeLocationPath? |
| | \| '//' RelativeLocationPath |
| | \| Variable |
| | \| Variable '/' RelativeLocationPath |
| | \| Variable '//' RelativeLocationPath |
| RelativeLocationPath | ::= Step |
| | \| RelativeLocationPath '/' Step |
| | \| RelativeLocationPath '//' Step |
| Step | ::= NodeTest Predicate* |
| | \| '.' |
| NodeTest | ::= '@'? NameTest |
| | \| NodeType '(' ')' |
| | \| 'processing-instruction' '(' Literal ')' |
| NameTest | ::= '*' |
| | \| QName |
| NodeType | ::= 'comment' |
| | \| 'text' |
| | \| 'processing-instruction' |
| | \| 'node' |
| Predicate | ::= '[' PredicateExpr ']' |
| PredicateExpr | ::= AndExpr |
| | \| PredicateExpr 'or' AndExpr |
| AndExpr | ::= EqualityExpr |
| | \| AndExpr 'and' EqualityExpr |
| EqualityExpr | ::= RelationalExpr |
| | \| EqualityExpr '=' RelationalExpr |
| | \| EqualityExpr '!=' RelationalExpr |
| RelationalExpr | ::= AdditiveExpr |
| | \| RelationalExpr '<' AdditiveExpr |
| | \| RelationalExpr '>' AdditiveExpr |
| | \| RelationalExpr '<=' AdditiveExpr |
| | \| RelationalExpr '>=' AdditiveExpr |
| AdditiveExpr | ::= MultiplicativeExpr |
| | \| AdditiveExpr '+' MultiplicativeExpr |
| | \| AdditivcExpr '−' MultiplicativeExpr |
| MultiplicativeExpr | ::= UnaryExpr |
| | \| MultiplicativeExpr '*' UnaryExpr |
| | \| MultiplicativeExpr 'div' UnaryExpr |
| | \| MultiplicativeExpr 'mod' UnaryExpr |
| UnaryExpr | ::= PathExpr |
| | \| '−' UnaryExpr |
| PathExpr | ::= LocationPath |
| | \| '(' PredicateExpr ')' |
| | \| Literal |
| | \| Number |
| | \| FunctionCall |
| FunctionCall | ::= FunctionName '(' ( Argument (',' Argument )* )? ')' |
| Argument | ::= PredicateExpr |
| FunctionName | ::= QName |
| EqualityExpr | ::= RelationalExpr |
| | \| EqualityExpr '=' RelationalExpr |
| | \| EqualityExpr '!=' RelationalExpr |
| RelationalExpr | ::= AdditiveExpr |
| | \| RelationalExpr '<' AdditiveExpr |
| | \| RelationalExpr '>' AdditiveExpr |
| | \| RelationalExpr '<=' AdditiveExpr |
| | \| RelationalExpr '>=' AdditiveExpr |
| AdditiveExpr | ::= MultiplicativeExpr |
| | \| AdditiveExpr '+' MultiplicativeExpr |
| | \| AdditiveExpr '−' MultiplieativeExpr |
| MultiplicativeExpr | ::= UnaryExpr |
| | \| MultiplicativeExpr '*' UnaryExpr |
| | \| MultiplicativeExpr 'div' UnaryExpr |
| | \| MultiplicativeExpr 'mod' UnaryExpr |
| UnaryExpr | ::= PathExpr |
| | \| '−' UnaryExpr |

APPENDIX A-continued

This appendix presents a BNF of a supported XQuery subset. The terminals are defined by known XQuery standards.

| | |
|---|---|
| PathExpr | ::= LocationPath |
| | \| '(' PredicateExpr ')' |
| | \| Literal |
| | \| Number |
| | \| FunctionCall |
| FunctionCall | ::= FunctionName '(' (Argument (',' Argument )* )? ')' |
| Argument | ::= PredicateExpr |
| FunctionName | ::= QName |

The invention claimed is:

1. A method of querying a stream of mark-up language data, comprising:
 receiving a query comprising a plurality of variables and generating a parse tree;
 receiving the stream of mark-up language data and generating a stream of events;
 evaluating the parse tree and stream of events, and buffering fragments from the stream of events that meet an evaluation criteria, each fragment corresponding to one of the plurality of variables;
 joining fragments to form a set of tuple results that satisfies the query for the stream of mark-up language data, each tuple result including a fragment for each of the plurality of variables; and
 storing the set of tuple results in a tangible recordable medium.

2. The method of claim 1, wherein the parse tree includes:
 a set of nodes corresponding to node tests in the query; and
 edges corresponding to relationships between node tests in the query.

3. The method of claim 2, wherein at least one of the nodes comprises an output node corresponding to a bound-out variable from the query.

4. The method of claim 2, wherein at least one of the nodes comprises a set of predicate parse trees.

5. The method of claim 2, wherein the evaluating step includes the step of generating a work array for storing evaluation data for the stream of events, wherein the evaluation data tracks matches between nodes and events.

6. The method of claim 5, wherein the evaluating step includes the step of generating a set of output buffers to store fragments that meet the evaluation criteria.

7. The method of claim 5, wherein the evaluating step includes:
 generating a set of predicate buffers to store the content of nodes participating in predicate expressions; and
 evaluating predicate expressions.

8. The method of claim 1, wherein the step of joining fragments includes the steps of:
 providing a buffer queue for each bound-out variable specified in the query; and
 identifying correct tuples by processing a cross-product of the buffer queues.

9. The method of claim 1, comprising the further steps of:
 identifying buffers that can be deleted; and
 deleting identified buffers.

10. The method of claim 1, wherein the mark-up language data comprises XML.

* * * * *